United States Patent [19]
Finch

[11] 3,800,757
[45] Apr. 2, 1974

[54] IGNITION SYSTEM FOR AN INTERNAL COMBUSTION ENGINE

[76] Inventor: Stanley R. Finch, 10903-56th St., Edmonton, Alberta, Canada

[22] Filed: Mar. 2, 1972

[21] Appl. No.: 231,235

[30] Foreign Application Priority Data
Mar. 12, 1971  Canada .............................. 107594

[52] U.S. Cl............................ 123/117 R, 123/148 E
[51] Int. Cl.............................................. F02p 5/00
[58] Field of Search ........ 123/32 EA, 117 R, 117.1, 123/148 E

[56] References Cited
UNITED STATES PATENTS

| | | | |
|---|---|---|---|
| 3,241,538 | 3/1966 | Hugenholtz ..................... | 123/148 E |
| 3,521,611 | 7/1970 | Finch .............................. | 123/117 R |
| 3,324,351 | 6/1967 | Pahl, Jr. .......................... | 123/148 E |
| 3,434,463 | 3/1969 | Bartch............................. | 123/148 E |
| 2,045,829 | 6/1936 | Boyce ............................. | 123/117 R |
| 3,592,178 | 7/1971 | Schiff............................... | 123/117 R |
| 3,670,706 | 6/1972 | Fujisawa.......................... | 123/32 EA |
| 3,361,123 | 1/1968 | Kasama et al................... | 123/148 E |

Primary Examiner—Laurence M. Goodridge

[57] ABSTRACT

For use with an internal combustion engine having a throttle, a crankshaft, distributor means connected in a predetermined timing relationship with said crankshaft and ignition means connected to said distributor means; an improved ignition timing system for controlling said ignition means, said timing system comprising a. speed detecting means connected to the crankshaft for detecting the speed thereof,
b. throttle position detecting means connected to the throttle for detecting the degree of openness thereof,
c. and time delay means connected to the ignition means for controlling energisation thereof at a selected time in relation to rotation of said crankshaft,
d. said time delay means being connected to said speed detecting means and to said throttle position detecting means for advancing said selected time in response to an increase in the crankshaft speed and for retarding said selected time in response to an increase in the openness of the throttle.

3 Claims, 17 Drawing Figures

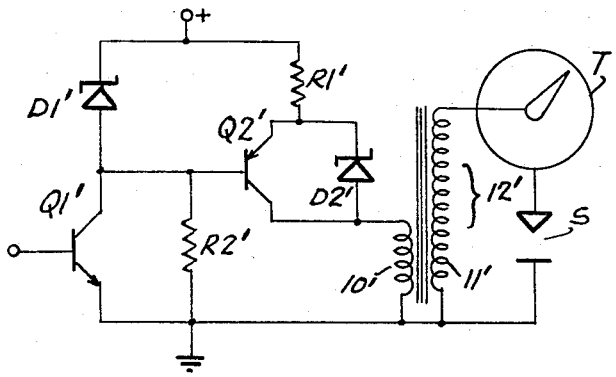
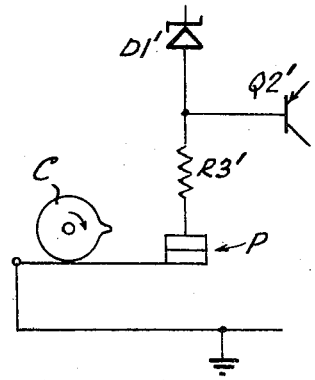
Fig. 11.
Fig. 13.
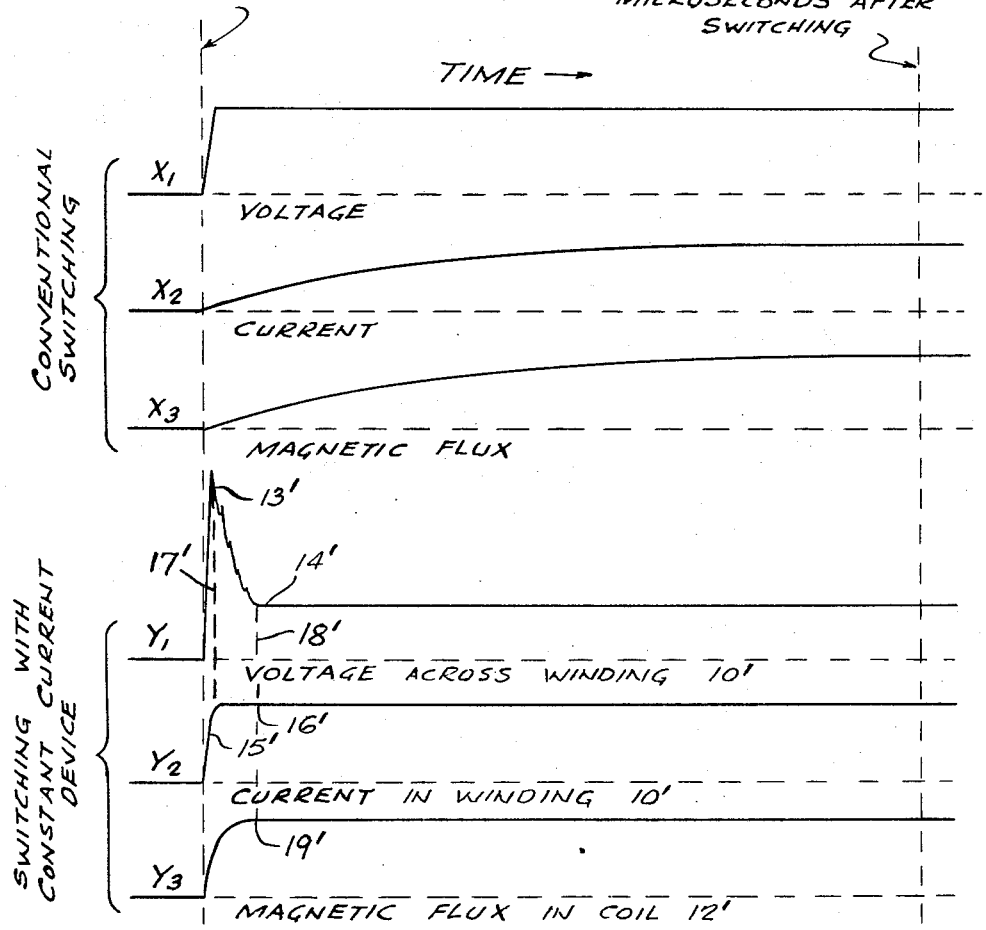
Fig. 12.

IGNITION SYSTEM FOR AN INTERNAL COMBUSTION ENGINE

A high initial voltage applied to the primary winding of an ignition coil causes rapid build up of current through such winding, notwithstanding its high impedance before flux has built up. As the current builds up this voltage is automatically reduced to the lesser value required to sustain the current. achieving a so-called constant current effect. The purpose is to reduce the recovery time of the system and hence minimise coil fade out at high engine speeds.

This invention relates generally to an improved ignition system for an internal combustion engine.

Internal combustion engines function by mixing fuel and air, compressing the mixture in a chamber, igniting the mixture and using the expansion of gases resulting from the heat of combustion to force down a piston which by its connection to the crankshaft causes the same to rotate.

It is common to provide an electrical impulse timed through a series of gears, chains and levers or other devices, in relation to the crankshaft rotation, to jump a gap inside the combustion chamber and produce a spark to ignite the mixture. An interval of time elapses between the jumping of the gap by the spark and the full expansion of the gases with combustion. It is therefore necessary to ignite the mixture somewhat before the crankshaft reaches the position, ("top dead center") where the downward thrust of the piston will cause the crankshaft to rotate in the correct direction. This is commonly called spark advance.

The amount of this advance must vary: firstly in degrees of crankshaft rotation, because a change of engine speed will change the angle through which the crankshaft will rotate during the time of combustion; and secondly, because changes in pressure and temperature within the chamber will change the combustion time measured in absolute time.

To deal with the first point it is common to use a device known generally as a mechanical advance, which device balances centrifugal force against spring tension using a series of weights, levers and springs to provide a device sensitive to engine speed that varies the advance in response to changes therein. Such devices can be affected by an alteration in the balance of forces caused by any change in wieght due to dirt, grease or wear, or by any change of spring tension due to temperature change or wear. They can also be affected in their movement by dirt, grease, or lack of it, and wear, and by any change in consistency of the grease due to a change in temperature.

To deal with the second point it is common to use a device known generally as a vacuum advance which consists of a spring supported diaphragm connected to the intake manifold that varies the amount of advance in response to variations in the difference between the intake manifold pressures and atmospheric pressure. Such devices operate on the assumption that measurements of the difference between intake manifold pressure and atmospheric pressure will accurately reflect the pressures and temperatures within the combustion chamber. In fact, this method is not entirely satisfactory, since it is subject to basically the same problems of movement as mentioned above. Additionally it is affected by leaks in the pressure sensitive system; or can become completely inoperative should the diaphragm be ruptured.

There are two important factors on which my present invention is based. The first factor is that the internal pressures in the cylinder are produced by the speed and by the throttle setting; accordingly these internal pressures can be determined by evaluating the speed and the throttle setting. The second factor is that timing the ignition from top dead center and advancing the ignition from this point in terms of degrees of rotation of the crankshaft is the same as calculating the timing from the point of maximum advance and delaying the ignition from this point to accommodate both the engine speed and the internal pressures.

I have found that the difficulties previously outlined and embodied in the commonly used devices can be eliminated by replacing these devices with a system that evaluates the throttle setting and the engine speed and, for minimum values of these functions, initiates an ignition pulse at the so-called point of "maximum advance," as used in the previously used devices, i.e., approximately 30° before top dead center. My system produces a signal that will delay the ignition pulse from this maximum advance time, in accordance with its evaulation of the throttle setting and the engine speed. The ignition pulse is delayed in direct proportion to throttle opening and in inverse proportion to engine speed, although not necessarily exactly linearly. The timing changes in my system follow essentially the same pattern as in the commonly used mechanical devices, but provides more precision and freedom from servicing needs and a greater range of variations.

The existing mechanical systems are limited to a timing change of about 30° in an eight cylinder engine, while my system in its preferred form can accommodate a timing change in excess of 60° in a similar engine.

The invention is also concerned with achieving a so-called constant current effect whereby current flow in the primary winding of the ignition coil builds up to full value nearly instantly after being switched on, thus reducing the recovery time normally needed by the coil and effectively eliminating coil fade out.

Numerous other advantages of my improved ignition control systems will be apparent from the following specification when read in the light of the appended drawings. It must be understood that while a specific embodiment is described and illustrated various changes and modifications falling within the scope of the appended claims may be made without departing from the scope of the invention.

In the drawings illustrating the preferred embodiment:

Figure 3:
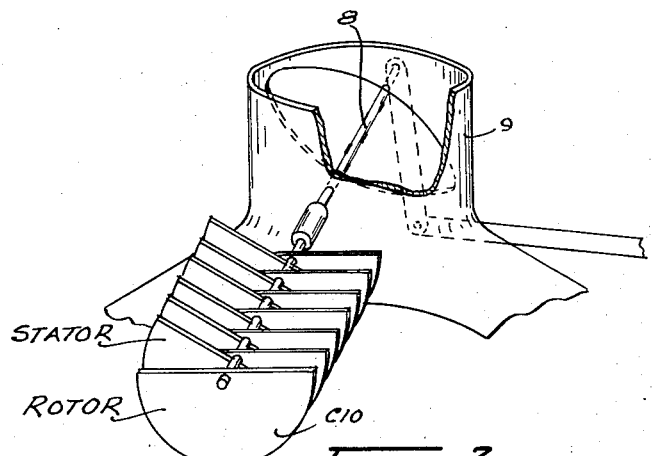
FIG. 3 is a diagrammatic side view showing a variable capacitor attached to a throttle shaft.
Figures 4A, 4C:
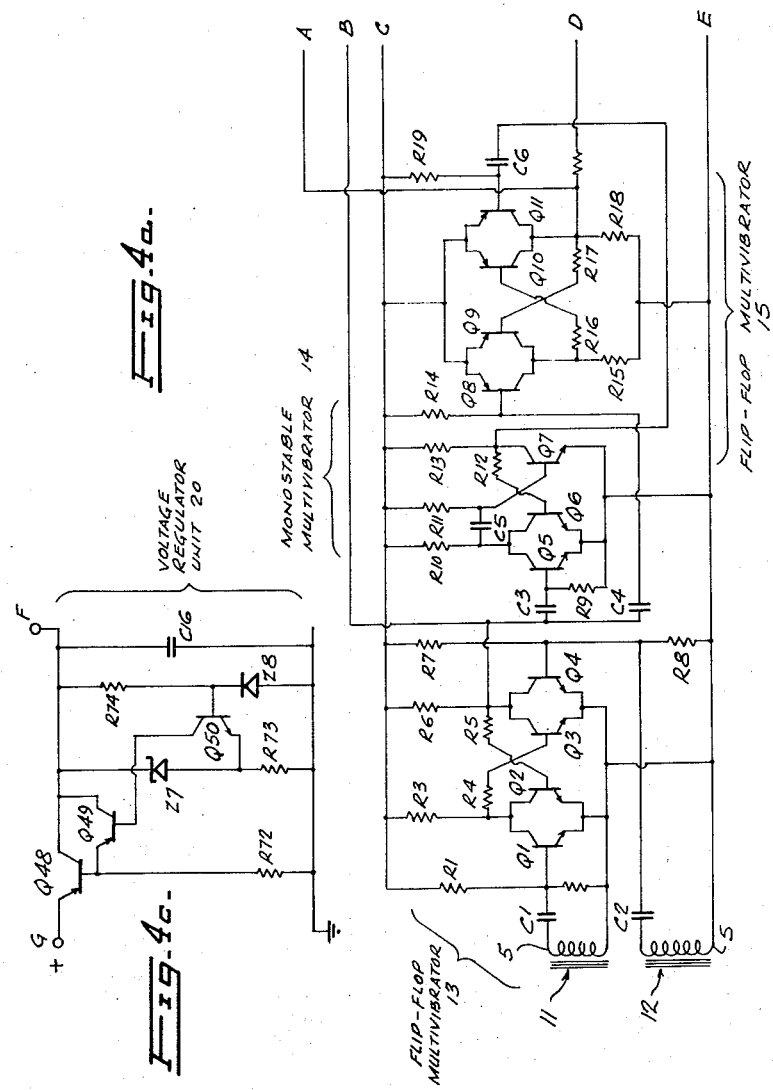
Figure 4B:
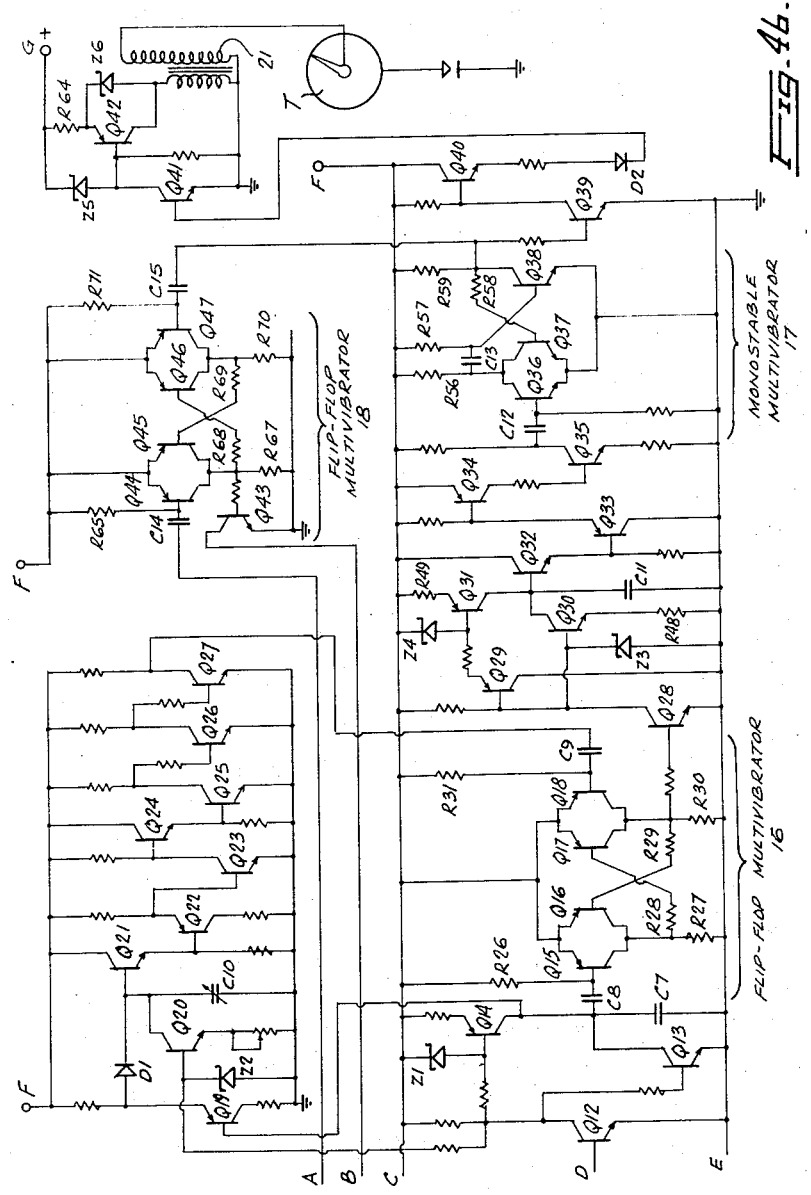
Figure 5:
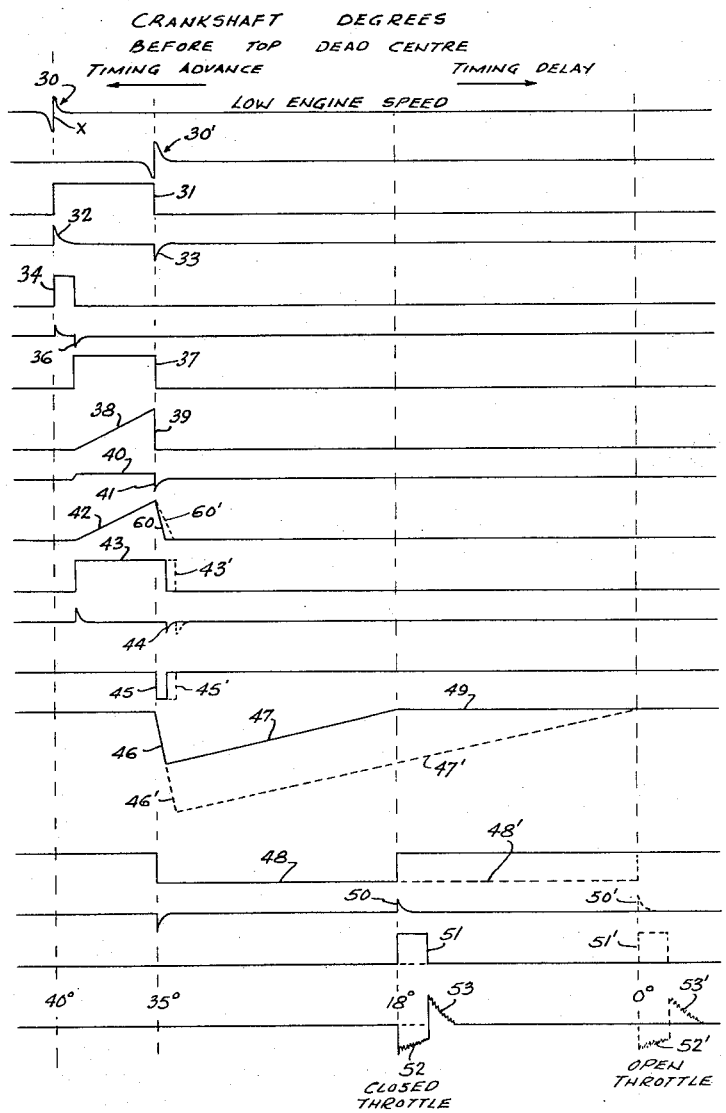
Figure 6:
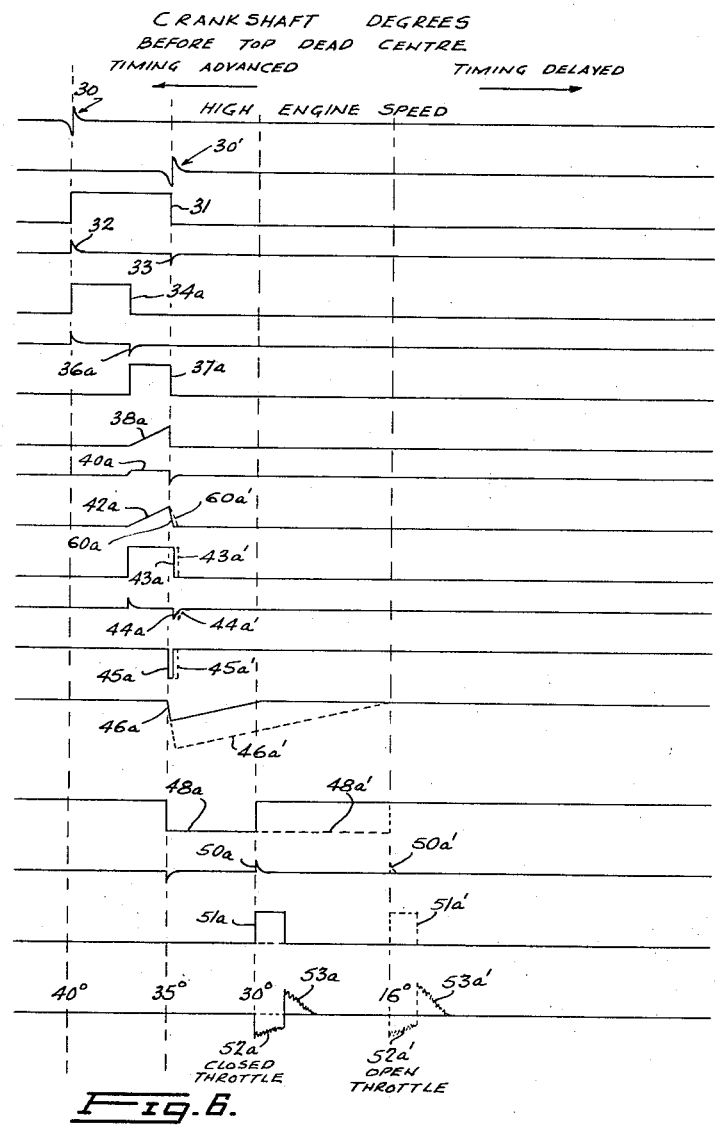
Figure 7:
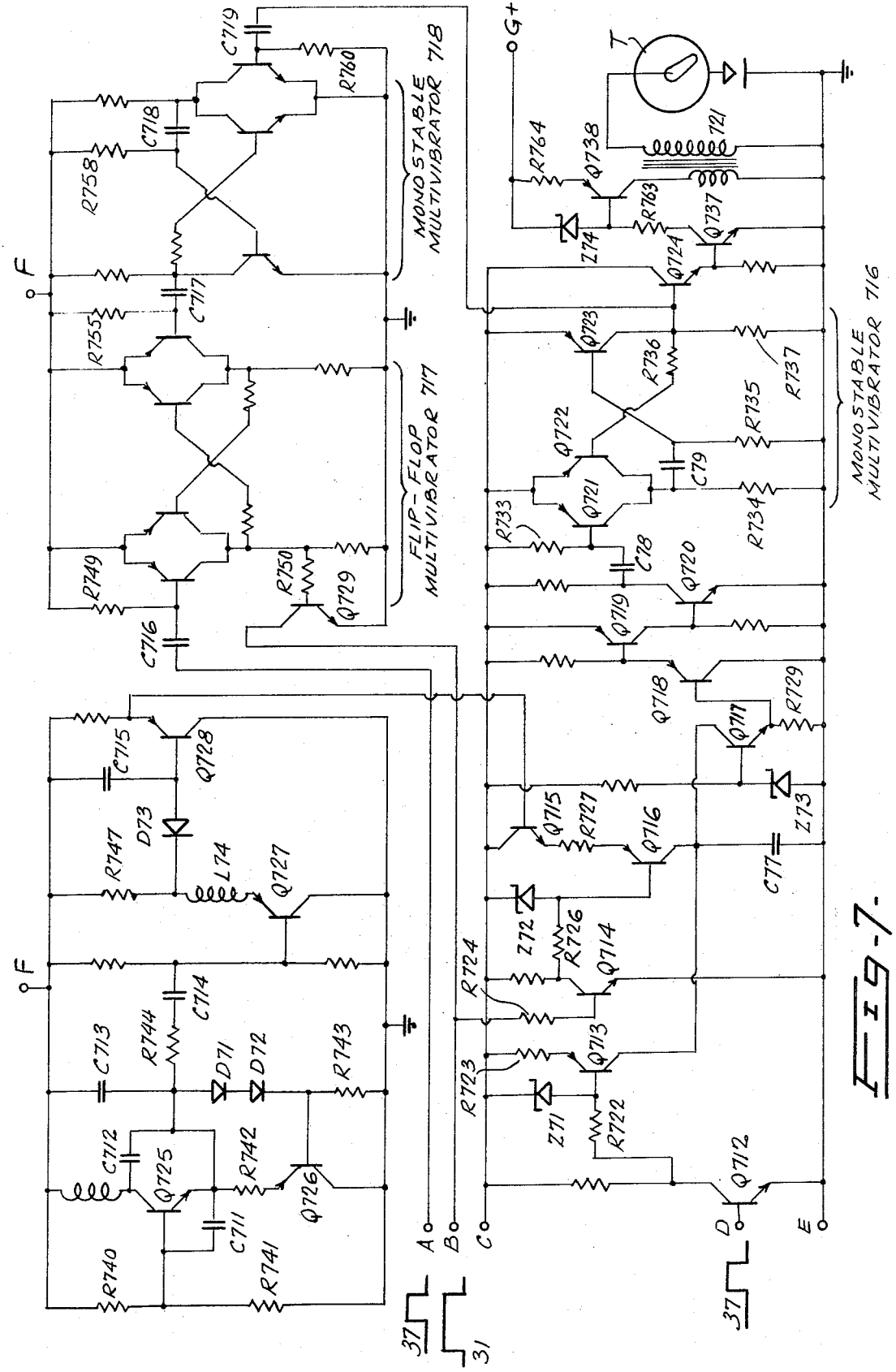
Figure 8A:
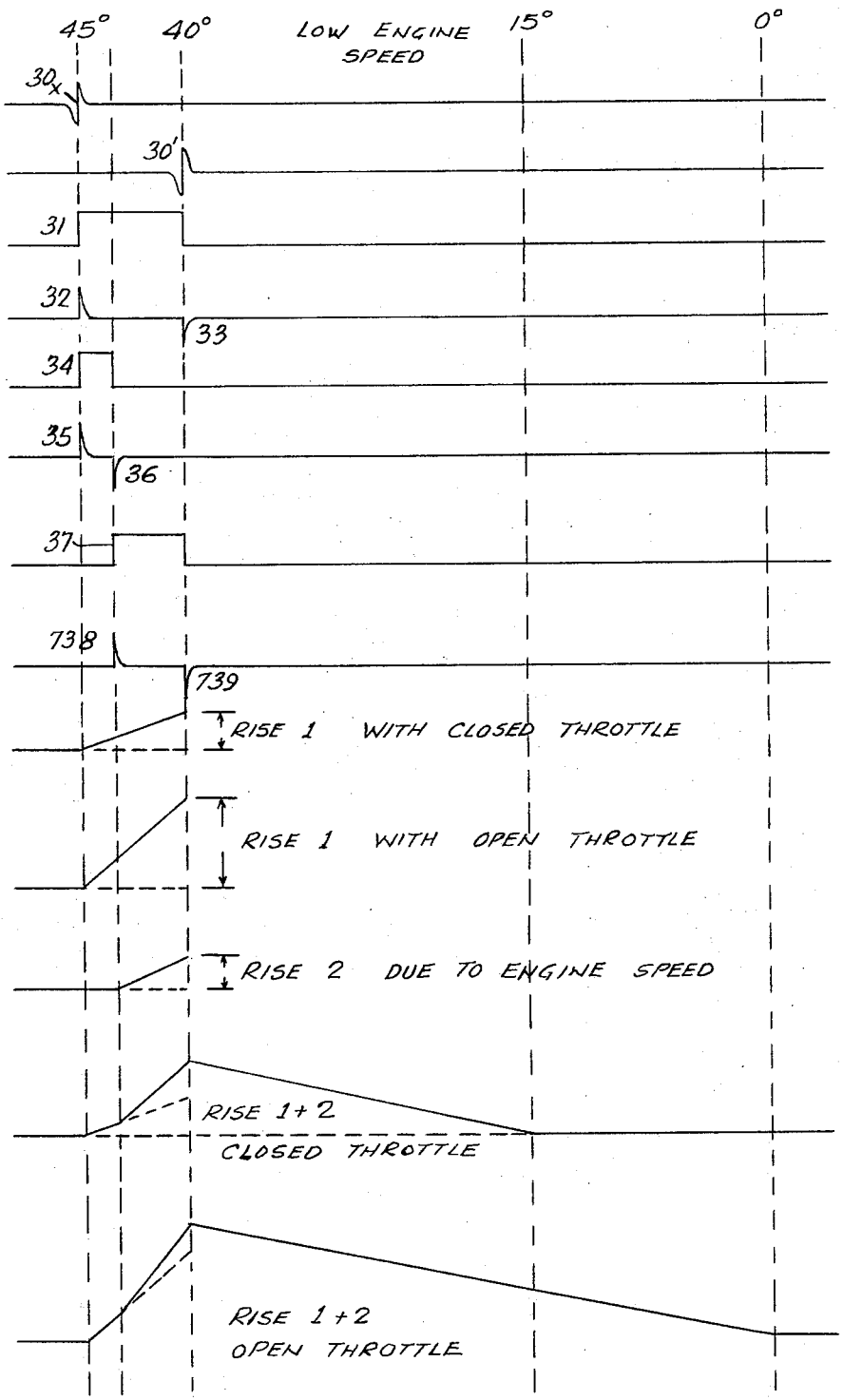
Figure 8B:
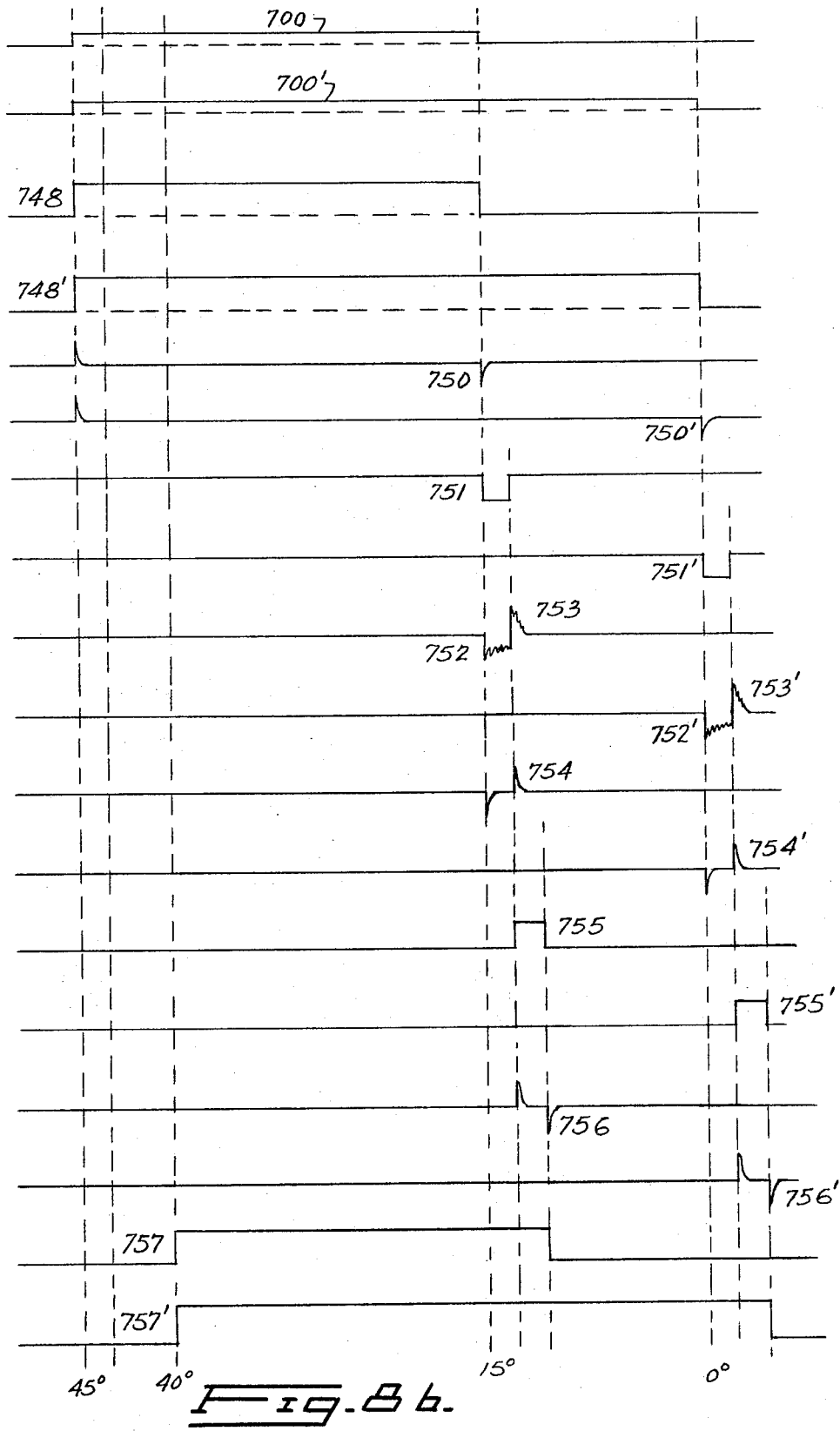
Figure 9A:
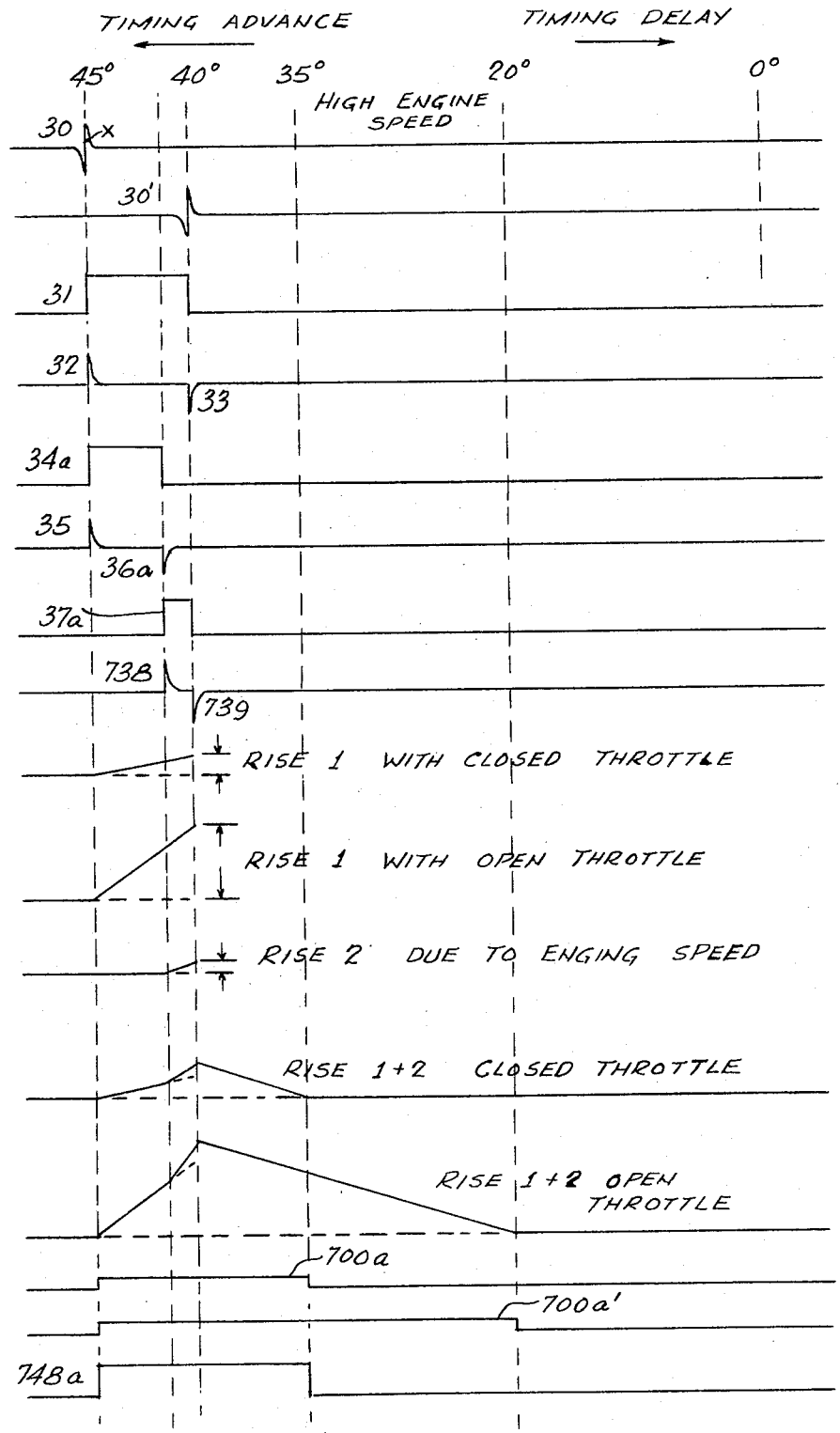
Figure 9B:
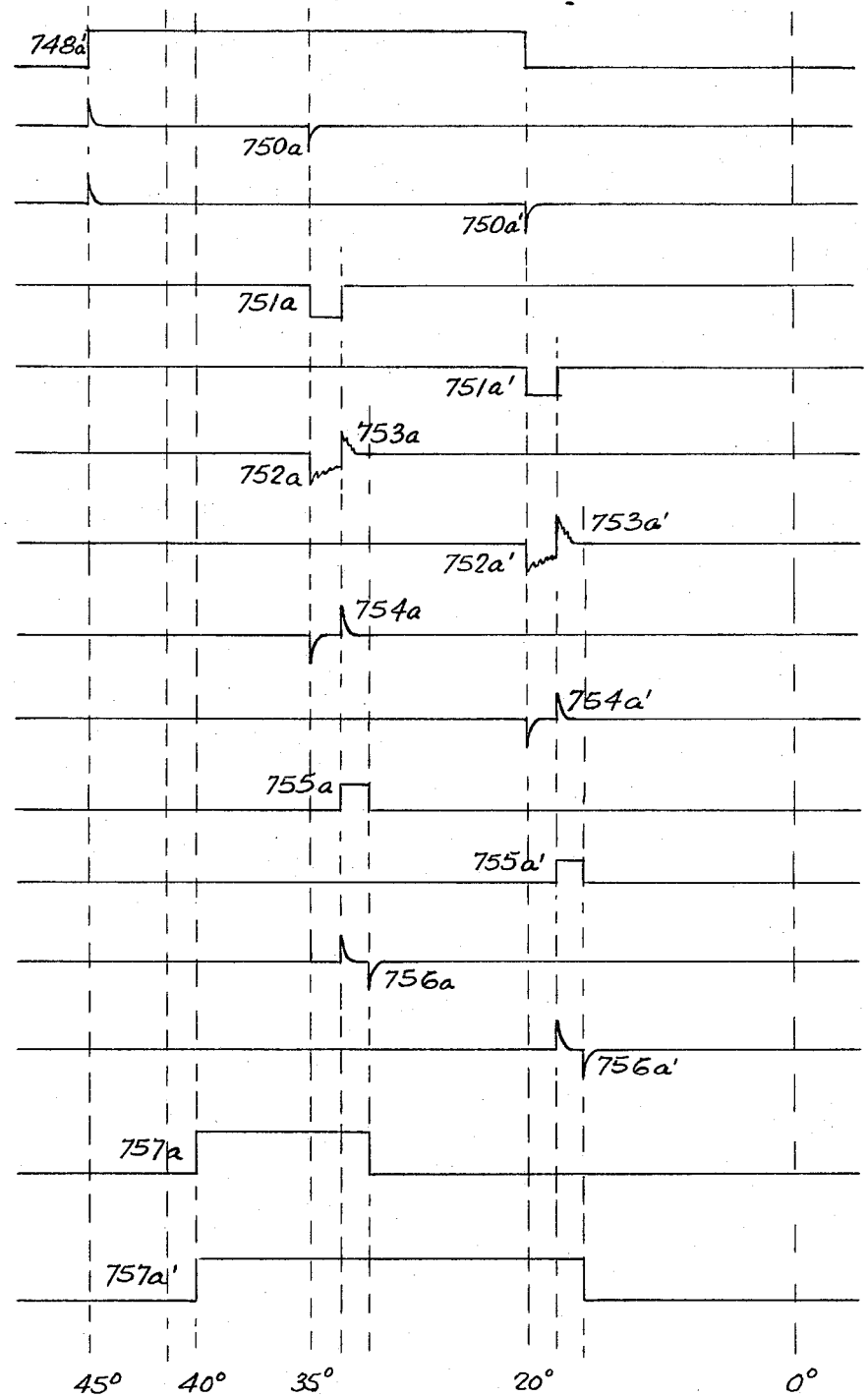
Figure 10:
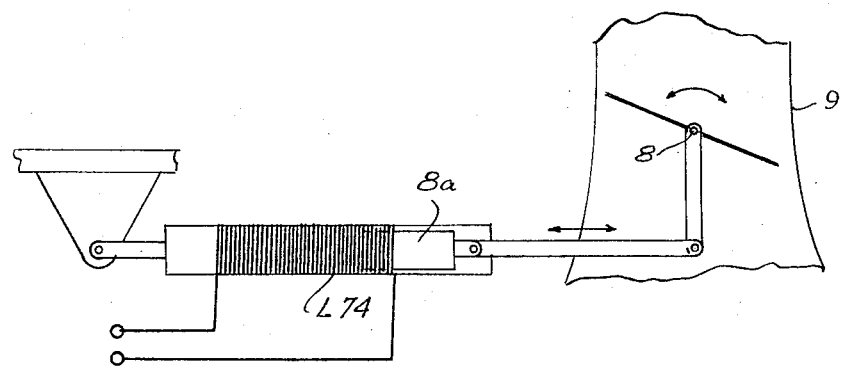

FIGS. 4a and 4b combine to form a circuit diagram, these two views joining each other at the lines marked A to E;

FIG. 4c is a further circuit diagram joined to FIGS. 4a and 4b by terminals F;

FIGS. 5 and 6 are pulse diagrams representing a sequence of wave forms plotted against degrees of crankshaft rotation;

FIG. 7 is a circuit diagram, representing an alternative to FIG. 4b;

FIGS. 8 and 9 (divided for reasons of space into FIGS. 8a, 8b, 9a and 9b) are pulse diagrams for the ciruit of FIG. 7;

FIG. 10 is a modification of FIG. 3;

FIG. 11 is a circuit diagram of an ignition system according to the invention;

FIG. 12 is a series of pulse diagrams illustrating the operation of the circuit of FIG. 11 and serving to compare it with that of a conventional ignition system; and FIG. 13 is an alternative fragment of FIG. 11.

Figure 1:
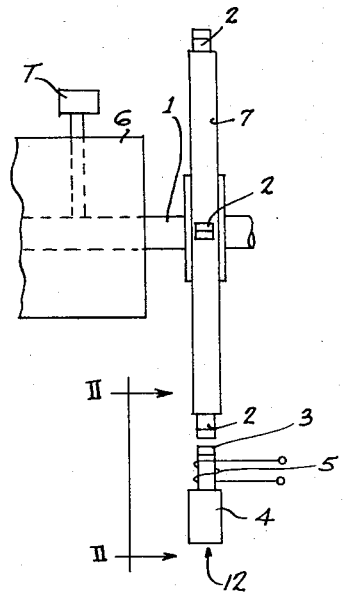
FIG. 1 is a diagrammatic side view showing a portion of an internal combustion engine and certain mechanical parts of the embodiment of a timing system according to the invention.
Figure 2:
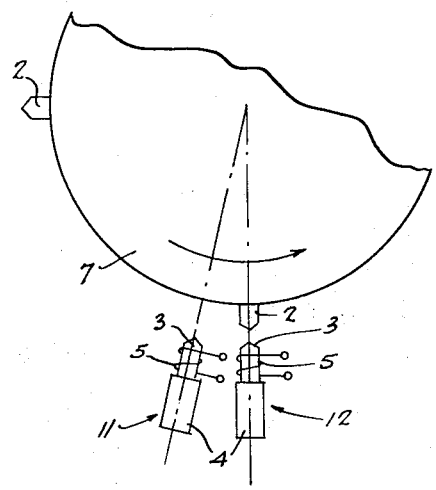
FIG. 2 is a section taken on the line II—II in FIG. 1.

With reference to FIGS. 1 and 2, an internal combustion engine shown diagrammatically at 6 has a distributor T and a crankshaft 1 carrying a flywheel or disc 7 having four pins 2 of soft iron or other magnetic material arranged uniformly around it periphery. the adoption of four pins corresponds to an eight cylinder engine. A six cylinder engine would require three such pins disposed symmetrically around the disc perimeter, assuming the engine to have a four stroke cycle. Each of the pins 2 is arranged to pass close to stationary magnetic assemblies in the form of pulse units 11 and 12.

Each of the pulse units 11 and 12 consists of a pole piece 3 of magnetic material connected to a permanent or electromagnet 4 having a winding 5 extending around the pole piece 3. As will be seen from FIG. 2 each pin 2 and pole piece number 3 is tapered to a relatively fine edge in order to define precisely the moment at which the end of each pin 2 approaches closest to and again starts to recede from the tip of a pole piece 3.

The form of pulse generated in each winding 5 by this action is shown as wave form 30 in FIG. 5, such pulse consisting of a gradual increase of voltage in a first direction, followed by a sudden and rapid reversal X of the polarity of the voltage, with finally a gradual decrease in voltage. The circuit that receives the pulses 30 from the windings 5 is adapted to sense this sudden reversal of polarity, i.e. to detect exactly the moment X, thus providing very precise timing of the exact moment when each pin 2 passes a pole piece 3. Referring to FIGS. 4a and 5, the pulse 30 generated by the first pulse unit 11 turns on a pulse sensing unit in the form of a flip-flop multivibrator 13, while the pulse 30' generated by the pulse unit 12 will turn this multivibrator off. The spacing of the two pulses is sufficient to provide clear and distinct switching for the range of engine speeds required, the second pulse 30' occurring sufficiently prior to the point of maximum advance to allow adequate time for the circuitry to operate.

Each pin 2 will co-operate with two of the eight spark plugs, the timing in relation to top dead center applying to the pistons in the cylinders containing these two spark plugs. No attempt has been made in the pulse diagrams to show more than a single pair of pulses for providing the ignition timing for a pair of cylinders having their pistons 360° out of phase with each other.

The detailed operation is as follows:

Pulse unit 11 triggers on the multivibrator 13 which consists of transistors Q1 to Q4, capacitors C1 and C2 and resistors R1 to R8. Pulse unit 12 triggers this multivibrator 13 off. A positive going square wave 31 is produced, whose duration represents a fixed angle of crankshaft rotation, regardless of the engine speed, and therefore decreases in absolute time as engine speed increases. The positive going leading edge of this square wave 31 is differentiated by a capacitor C3 and a resistor R9 to produce a positive going spike 32 that triggers a monostable multivibrator 14 consisting of transistors Q5 to Q7, resistors R10 to R13, and capacitor C5. This multivibrator 14 produces a square wave 34 whose duration is determined by the CR time of the capacitor C5 and the resistor R11 and which is set to be slightly shorter than the shortest possible absolute time between the pulses 30 and 30' at the highest engine speed.

The negative going trailing edge of the square wave output 34 of the multivibrator 14 is differentiated by a capacitor C6 and a resistor R19 to produce a negative going spike 36 that triggers on a further flip-flop multivibrator 15 consisting of transistors Q8 to Q11 and resistors R15 to R18. The negative going trailing edge of the square wave output 31 of the multivibrator 13 is differentiated by a capacitor C4 and a resistor R14, to produce a negative going spike 33 to trigger the multivibrator 15 off. Thus the output of the multivibrator 15 is a positive going square wave 37.

This wave form 37 is inverted by a transistor Q12 (FIG. 4b), and the negative going output is coupled through parallel resistors to transistors Q13, Q14 and Q20, causing transistors Q13 and Q20 to shut off and transistor Q14 to conduct, during the duration of the wave form. The shutting off of transistor Q13 prevents the discharge of a small variable capacitor C10.

The transistor Q14 along with a Zener diode Z1 and a resistor R25 form a constant current device that allows a capacitor C7 to charge during the on time of the wave form 37, as represented by the voltage wave form 38. This voltage on the capacitor C7 is coupled by an emitter follower transistor Q19 and a diode D1 to the variable capacitor C10. At the end of the wave form 37 the transistors Q13 and Q20 conduct and the transistor Q14 shuts off. The capacitor C7 is then discharged almost instantaneously by the transistor Q13 see the trailing edge 39 of the wave form 38. The capacitor C7 is effectively decoupled from the variable capacitor C10 by diode D1. The capacitor C10 now discharge through the transistor Q20 which together with a resistor R35 and a Zener diode Z2 forms a further constant current device.

The discharge time of the capacitor C10 will be dependent firstly upon the voltage initially applied to it, as coupled through from the capacitor C7, and secondly upon the size of the variable capacitor C10, which is regulated by the throttle setting. As shown in FIG. 3 the variable capacitor C10 is attached to the throttle shaft 8 in the carburettor 9 in such a manner that when the throttle is open the capacitance is largest and when the throttle is closed the capacitance is least.

Thus the time of discharge of the capacitor C10 is related inversely to the engine speed (height of the wave 38) and directly to the throttle setting (capacitance of the capacitor C10). The shape of the leaves of the variable capacitor C10 can be designed to render the variation in capacitance value non-linear with throttle shaft rotation in order to meet the needs of a particular engine so that optimum timing curves are obtained.

The wave form 38 from the capacitor C7 is differentiated by a capacitor C8 and a resistor R26 to produce the wave form 40 which includes a negative going spike 41 formed by the rapid discharge 39 of the capacitor C7. The spike 41 triggers on a flip-flop multivibrator 16 consisting of transistors Q15 to Q18 and resistors R27 to R30.

The wave form 42 from the variable capacitor C10 is isolated and amplified to produce a square wave form 43 by means of transistors Q21 to Q27 inclusive. This square wave 43 is positive going, so that the negative switching of its trailing edge differentiated by a capacitor C9 and a resistor R31 produces a negative going spike 44 that turns off the multivibrator 16. The "on" time of the multivibrator 16 is shown at 45, being the difference between the start of discharge of the variable capacitor C10 (spike 41) and completion of discharge of the variable capacitor C10 (spike 44). Thus the duration of this wave form 45 is dependent upon the engine speed, which sets the applied voltage, and the throttle setting, which determines the size of the capacitor. Since the capacitor discharge time is dependent upon the initial charge and the capacitance of the capacitor, the duration of the output 45 represents the required summation of the variations required for changes in engine speed and for changes in demand as reflected by the throttle setting.

This negative going square wave 45 is amplified and inverted by a transistor Q28, so that a positive going square wave is coupled to the base of transistors Q29 and Q30 simultaneously, causing the transistor Q29 to shut off while the transistor Q30 conducts. The transistor Q30, a resistor R48 and a Zener diode Z3 form a further constant current device, a previous charged capacitor C11 discharging (wave form 46) in proportion to the "on" time of this square wave 45. When the square wave 45 ends, the transistor Q30 shuts off and the transistor Q29 conducts, allowing a further constant current device consisting of a transistor Q31, a Zener diode Z4 and a resistor R49 to recharge the capacitor C11 (wave form 47) at a constant rate. The time interval taken discharging and recharging the capacitor C11 produces a signal 48 that delays the ignition timing by the required amount. This effect is achieved by means of emitter follower transistors Q32 and Q33 and amplifying transistors Q34 and Q35 to produce the negative going square wave 48 whose duration is the entire time that the charge on the capacitor C11 is below the maximum voltage 49.

The square wave 48 is differentiated by a capacitor C12 and a resistor R55, the positive going signal at the trailing edge of the wave 48 producing a positive going spike 50 that turns on a monostable multivibrator 17 consisting of transistors Q36, Q37 and Q38, resistors R56 to R59, and a capacitor C13. The "on" time of the multivibrator 17 is determined by the CR time of the capacitor C13 and the resistor R57, and is set to produce a width of output signal 51 that will provide optimum off time for the switching of the primary winding of the ignition coil 21. This output 51 of the multivibrator 17 is amplified and inverted through a transistor Q39 and isolated through a transistor Q40 and a diode D2 to shut off a transistor Q41. A transistor Q42, a resistor R64 and a Zener diode Z5 form further constant current device to provide the optimum current for the primary winding of the coil 21, conduction through the transistor Q41 providing the forward bias necessary for this constant current device. When the transistor Q41 shuts off, the transistor Q42 becomes reverse biased and shuts off the primary current in the coil 21.

Thus the output 51 of the multivibrator 17 produces a very sharp switching off of the primary current in the coil 21; and the constant current device permits nearly full battery voltage to be initially applied to the coil 21 to build up the magnetic field, dropping the voltage very rapidly to that necessary to maintain the magnetic field of the coil in anticipation of the next switching off. The "firing" 52 of the coil 21 and the restoration 53 to the "ready to fire" condition thus take place in a short time, permitting high engine speeds without fading of the coil output. FIG. 4b shows the coil 21 diagrammatically connected to a spark plug S through the distributor T.

Since the discharge of the secondary winding of the coil 21 produces quite strong ground spikes, it is necessary to desensitize the mutlivibrator 13 during this time. This effect is achieved by another flip-flop multivibrator 18 acting as a desensitizing unit. The positive going output square wave 37 of the multivibrator 15 is differentiated by a capacitor C14 and a resistor R65, the negative going trailing edge producing a negative going spike (not shown) that turns on the multivibrator 18 which consists of transistors Q44 to Q47 and resistors R67 to R70. The positive going square wave output 51 of the multivibrator 17 is differentiated by a capacitor C15 and a resistor R71, the negative going trailing edge of this wave producing a negative going spike (not shown) to turn off the multivibrator 18. The positive going square wave output of the multivibrator 18 is coupled to the base of a transistor Q43 which effectively grounds the multivibrator 13 which is thus desensitized from the time when the signal 30' from the pulse unit 12 is applied to it until completion of the off time of the ignition coil.

Transistors Q48 to Q50, resistors R72 to R74, Zener diodes Z7 and Z8 and a capacitor C16 form a voltage regulator unit (FIG. 4c) that supplies a regulated voltage to the other units, the terminals designated F being interconnected. The terminals designated G are supplied from the battery and generating system.

FIG. 5 shows in full lines the wave form conditions for low speed and closed throttle. If the throttle is now opened, the capacitance of the capacitor C10 is increased. The applied voltage will have supplied a large charge which will now take longer to discharge through the constant current device, causing the waveform 42 to have a discharge slope 60' (broken lines) that is less steep than the slope 60 (full lines) which applies to the closed throttle condition. The trailing edge of the wave form 43 is similarly modified at 43' and the wave form 45 becomes 45' of greater duration, so that in turn the wave forms 46 and 47 become 46' and 47'. The waveform 48 is elongated to 48', so that the spike 50 is replaced by the spike 50'; similarly the wave forms 51, 52 and 53 are replaced by the later occurring wave forms 51', 52' and 53'. Thus an open throttle causes less advance of ignition timing.

FIG. 6 shows conditions for high engine speed, in full lines for a closed throttle, and in broken lines for an open throttle. Wave forms 30, 30', 31, 32 and 33 are the same as in FIG. 5. Wave form 34 becomes elongated to wave form 34a, this pulse being the output of the multivibrator 14, whose duration is a fixed absolute time and hence more crankshaft degrees at a higher engine speed. The spike 36a consequentially occurs later, and the signal 37a is shorter, the length of this control signal measured in crankshaft degrees thus varying inversely with engine speed. Consequentially the capacitor C7 is charged for a shorter time and thus to a lower voltage (wave form 38a); hence wave form 40a is shorter and wave form 42a reaches a lower peak value. Slope 60a (closed throttle) shows a relatively quick discharge; slope 60a' (open throttle) shows a slower discharge of the capacitor C10.

The other wave forms shown in FIG. 6 follow the same general form as those of FIG. 5, only the timing being different. Thus wave forms 43a, 44a, 45a, 46a, 48a, 50a, 51a, 52a and 53a (full lines) correspond to the similarly identified wave forms in FIG. 6 for the closed throttle condition, while the same wave forms identified by the primed numerals (broken lines) show the timing for the open throttle condition.

A comparison of the locations of the firing pulses 52, 52', 52a and 52a' shows that the timing is delayed in direct proportion to the throttle opening (compare pulses 52' and 52a' respectively with pulses 52 and 52a) and in inverse proportion to engine speed (compare pulses 52a and 52a' respectively with pulses 52 and 52').

Regarding the degrees of crankshaft rotation shown on FIGS. 5 and 6, it is to be understood that these diagrams are not drawn to scale and numerical values are shown by way of example only. These values will vary with the required maximum speed for each engine. While initiation of the pulse from pulse unit 11 may be ideal at 35° before "top dead center" for an engine whose maximum speed is 2,500 rpm; it may have to be 65° or more before "top dead center" with high speed engines. To provide the delay to "top dead center" or later, for starting and idling, the slope of the recharge curve of the capacitor C11 will be reduced as necessary, with the control of depth of discharge being the same, except that the full depth will be for a maximum delay of 60° instead of 25° as would be the case in the first instance.

In the modified circuit the portion shown in FIG. 4a is unchanged. Referring now to FIG. 7, the wave form 31 is inverted by a transistor Q714 and the negative going output is coupled by a resistor R726 to a transistor Q716. A Zener diode Z72 provides a reference voltage and a resistor R727 and a transistor Q715 provide a variable resistance which in conjunction with the Zener diode 272 and the transistor Q716 make a variable, constant current device. Therefore the charge coupled through to a capacitor C77 will act as a constant current charge, except as the rate is varied by the voltage applied to the base of the transistor Q715. (See Rise 1 FIGS 8 and 9).

To provide this variable voltage at the base of the transistor Q715 an oscillator consisting of transistors Q725 and Q726, capacitors C711 to C713, resistors R740 to R743, and diodes D71 and D72, supplies an alternating current through a resistor R744 and a capacitor C714 to a transistor Q727. An impedance winding L74 changes the circuit impedance in relation to the position of its core 8a which is attached to the throttle 8 (See FIG. 10). The throttle position determines the amplitude of the alternating signal available at the junction of a resistor R747, the winding L74, and a diode D73. The rectified voltage produced is filtered by a capacitor C715 and applied to the base of a transistor Q728. This signal is in turn coupled to the transistor Q715, so that the voltage produced as a result of the throttle setting controls the rate of charge of the capacitor C77 during the duration of the wave form 31.

The wave form 37 (or 37a) is inverted by a transistor Q712 and the negative going output is coupled through a resistor R722 to a transistor Q713 which in conjunction with a Zener diode Z71 and a resistor R723 form a constant current device that allows the capacitor C77 to be charged at a constant rate during the on time of of the wave form 37 (See Rise 2, FIGS. 8 and 9).

A transistor Q717 in conjunction with a resistor R729 and a Zener diode Z73 form a constant current discharge circuit which is not shut off. The charges applied to the capacitor C77 are at a rate high enough to overcome this discharge. The discharge rate is set to produce the proper slope to create the time delay necessary (see Rise 1 plus Rise 2, FIGS. 8 and 9).

The point of return of the capacitor C77 to a neutral charge is the point used to trigger the final switching of the circuitry. As long as the capacitor C77 is being discharged through the constant current device there is a potential across the resistor R729 which remains constant. This is demonstrated by wave forms 700, 700', 700a and 700a' in FIGS. 8 and 9, and corresponding respectively to low speed, closed throttle; low speed, open throttle; high speed, closed throttle; and high speed, open throttle. As soon as the capacitor C77 has returned to a neutral charge, this potential disappears. This change of voltage is isolated through a transistor Q18, and is doubly amplified through transistors Q719 and Q720 to provide wave form 748, 748', 748a and 748a' that correspond to respective wave forms 48 to 48a' of FIGS. 5 and 6.

The negative going trailing edge of the square wave 748 etc. is differentiated through a capacitor C78 and a resistor R733 to produce a negative going spike 750 (750', 750a or 750a') that triggers on a monostable multivibrator 716, which consists of transistors Q721 to Q723, resistors R734 to R737, and a capacitor C79. The on time of the monostable multivibrator 716 is determined by the CR time of the capacitor C79 and the resistor R735 and is set to produce a width of signal 751 (751', 751a or 751a') that will provide optimum off time for the switching of the primary winding of the ignition coil 721 — see wave form 752 (752', 752a or 752a'). The output of the monostable multivibrator 716, i.e., the wave form 751, etc., is coupled through a transistor Q724 to reverse bias a transistor Q737, shutting off a transistor Q738 and the primary circuit of the coil 721 — see wave form 752 and 753 etc. — causing "firing" of the secondary winding. The output of the monostable multivibrator 716 (wave form 751 etc.) produces a very sharp switching off of the primary current in the coil 721. The constant current device consisting of the transistor Q738, a resistor R764, and a Zener diode Z74, permits nearly full battery voltage to be initially applied to the coil 721 to build up the magnetic field instantly the primary current is turned back on. The voltage drops very rapidly to only that necessary to maintain the magnetic field of the coil in anticipation of the next switching off. The "firing" wave form 752 etc. of the coil 721 and the restoration wave form 753 etc. to the "ready to fire" condition takes place in a very short time. This permits high engine speeds without fading of the high voltage output of the coil.

Since the discharge of the secondary winding of the coil 721 produces quite strong ground spikes, it is necessary to desensitize the flip-flop multivibrator 13 during this time. This effect is achieved by the use of another flip-flop multivibrator 717 as a desensitizing unit. The positive going square wave 37, the output of the flip-flop multivibrator 15, is differentiated by a capacitor C716 and a resistor R749 (See wave form 738, 739 FIGS. 8 and 9) and the negative going trailing edge produces a negative going spike which turns on the flip-flop multivibrator 717. The negative going square wave output of the monostable multivibrator 716, wave form 751 etc., is differentiated by a capacitor C719 and a resistor R760. The positive going trailing edge of the wave form 751 produces a positive going spike, wave form 754 (754', 754a or 754a') that turns on a monostable multivibrator 718, whose duration of on time is fixed by the CR time of a capacitor C718 and a resistor R758. The time provided allows for the abatement of the oscillations, wave form 753, etc., produced in the primary winding by the extremely fast turning on of this circuit. The positive going square wave produced by the monostable multivibrator 718, wave form 755 (755', 755a or 755a'), is again differentiated by a capacitor C717 and a resistor R755, so that the negative going trailing edge of the wave form 755 etc. produces a negative going spike 756 (756', 756a or 756a') that triggers off the flip-flop multivibrator 717, whose output 757 (757', 757a or 757a') is coupled through a resistor R750 to a transistor Q729. This effectively grounds the flip-flop multivibrator 13 which is thus desensitized from the time when the signal 30' from the pulse unit 12 is applied to it until the completion of the off time and the switching on again of the ignition coil.

In summary, the absolute time that the flip-flop multivibrator 13 is on is compared with the absolute time that the monostable multivibrator 14 is on, to produce a difference exhibited by the output of the flip-flop multivibrator 15, wave form 37 or 37a. With a fixed charge rate the charge on the control capacitor C77 during the on time of wave form 37 will be an inverse function of engine speed. During the on time of the flip-flop multivibrator 13, which produces wave form 31, the control capacitor C77 is also charged at a rate determined by the throttle setting in such manner that the greater the throttle opening the greater the rate of charge. The two rates of charge are summed, so that the total charge on the control capacitor C77 reflects jointly both engine speed and throttle setting, for control of the timing of the ignition.

The circuit of FIG. 11 does not illustrate the timing circuit. Preferably, but not necessarily, the timing circuit can be that shown in the foregoing Figures, and more particularly in FIGS. 4a and 4b. The transistor Q1' in FIG. 11 then corresponds to the transistor Q41 in FIG. 4b and receives on its base at the desired moment of operation a timing pulse from the timing circuit.

Assume that initially the transistor Q1' is biased to its off position to prevent current flowing from the positive source to ground. This condition causes the base of a transistor Q2' to be at full positive voltage, thus reverse biasing this transistor and shutting off current flow through the primary winding 10' of an ignition coil 12'.

When the base of the input transistor Q1' is now reversed in polarity to render the transistor conductive, it completes a circuit to ground, thus dropping the voltage at the junction of a Zener diode D1' and the transistor Q1', which junction is connected to the base of the transistor Q2', almost to ground, or more accurately to a voltage below battery voltage equal to the drop across the diode D1'. This less positive voltage now forward biases the transistor Q2' to render the same conducting. Since the impedance of the winding 10' is comparatively high until a magnetic flux has built up in the coil 12', such winding offers a comparatively high resistance in the circuit. As a result there is a comparatively high voltage across the winding 10' and a comparatively small voltage drop across the resistor R1'. The combination of the latter voltage drop in series with the voltage drop across the emitter-base junction of the transistor Q2', is not as great as the voltage drop across the diode D1', which condition serves to retain a heavy forward bias on the transistor Q2', so that almost the full battery voltage is applied to the winding 10'. This so-called "first" voltage is illustrated at 13' on a waveform Y1 in FIG. 12.

As soon as the required current starts to flow through the winding 10', the impedance of this winding 10' is reduced, so that the voltage drop across the resistor R1' in series with the emitter-base junction of the transistor Q2' more nearly matches the voltage drop across the diode D1'. As a result the transistor Q2' ceases to be so heavily forward biased and the voltage across the winding 10' is reduced to a so-called "second" voltage shown at 14' in the waveform Y1. As a result of the initially high first voltage the current Y2 in the winding 10' initially increases very rapidly, as shown at 15', but now assumes a constant value 16', this value being maintained as long as the transistor Q1' is conducting by the reduced second voltage. The size of the resistor R1' is so selected that, when the desired amount of current is flowing through the primary winding 10', the voltage drop across this resistor in series with that across the emitter-base junction of the transistor Q2' matches the voltage drop across the diode D1'. This arrangement renders the circuit a constant current device.

In other words, as the magnetic flux of the coil 12' is built up (waveform Y3) it takes progressively less voltage to keep the same current flowing, so that the transistor Q2', in varying its forward bias and offering more resistance in the circuit, lowers the voltage applied to the winding 10' to the lesser vlaue 14' that is all that is required to maintain the current flow once the magnetic field exists.

Broken line 17' demonstrates the time coincidence between the maximum voltage 13' and the current reaching its maximum value; and line 18' demonstrates the time coincidence between the moment of reaching the reduced voltage 14' and the flux Y3 reaching its maximum value at 19'.

When the transistor Q1' is now pulsed to be switched off again to "fire" the circuit, the base of the transistor Q2' rises to battery voltage thus shutting off current flow through the transistor Q2' and through the primary winding 10' of the coil 12'. In the conventional manner this interruption of current flow causes breakdown of the magnetic field of the coil to generate a flow of high voltage current in the secondary winding 11', which current is conducted to ground through the distributor T and one or other of the spark plugs S, of which only a single example has been illustrated. The timing of this "firing" is thus controlled by the electrical ignition timing system which pulses the transistor Q1' off.

In conventional ignition switching circuits the primary winding of the ignition coil has applied to it a constant voltage (waveform X1). Because of the impedance offered by the coil until the magnetic field has been built up (waveform X3), the current flow builds up only gradually (waveform X2). As a result, a considerable time is required for the coil to reach the maximum condition at which it can produce the desired high voltage in the secondary winding when "fired." As shown diagrammatically in FIG. 12, the build up of current shown by the waveform X2 requires at least 1,000 microseconds before it is nearing completion. At high engine speeds the time provided between firings of the coil does not allow sufficient recovery time for this relatively slow build up of the magnetic field of the coil, and what is known as "coil fade-out" occurs, i.e., the secondary winding is not producing a voltage high enough for proper ignition in the engine.

The present circuit overcomes this problem by use of a constant current device that initially applies a higher voltage than that needed subsequently, in order to cause the full current to flow almost instantaneously (waveform Y2) and the magnetic field (waveform Y3) to build up at a much higher rate than previously (waveform X3). If required, the coil can be fired as soon as 20 or 30 microseconds after switching on of the primary circuit without significant fade-out.

While the transistor Q1' must conduct enough base current to fully switch the main transistor Q2', it must not conduct too much current, or it will burn out its own emitter-base junction. If the internal resistance value of the transistor that it is convenient to select as the input transistor Q1' is not correctly related to these requirements, a resistor may be placed in parallel or in series with it, to ensure optimum current flow through the base of the transistor Q2'. A resistor R2' can be included to provide such compensation, if the transistor Q1' offers too much resistance and an alternate path to the base of the transistor Q2' is necessary. This resistor R2' can be omitted, however, in cases where the transistor Q1' does not offer too much resistance. Moreover, a further resistor (not shown) may be inserted in series with the emitter of the transistor Q1', if desired to prevent burnout of the emitter-base junction of the transistor Q2'. Whether this latter additional resistor is required or not will depend upon the internal resistance of the transistor Q1'.

A Zener diode D2' is provided across the transistor Q2' as a safety device to protect this transistor against voltage surges when switching occurs. It also can be omitted, if a sufficiently heavy transistor not subject to such damage is used as the main transistor Q2'.

An alternative embodiment of the invention is illustrated in FIG. 13 which is a fragmentary view of a variant of FIG. 11, in which the switching transistor Q1' has been replaced by a pair of points P operated by the usual cam C of the distributor T. To determine the exact moment of "firing" the cam C will open the points P and thus cause reverse biasing of the transistor Q2', as before. In this case a series resistor R3' is included, since the points P have no internal resistance.

The essential feature of this construction, namely the so-called constant current effect, whereby the build-up of current in the winding 10' is very rapid once the points P have reclosed, is essentially the same as in the circuit of FIG. 11.

I claim:

1. For use with an internal combustion engine having a throttle, a crankshaft, distributor means connected in a predetermined timing relationship with said crankshaft and ignition means connected to said distributor means; an improved ignition timing system for controlling said ignition means, said timing system comprising a. speed detecting means connected to the crankshaft for detecting the speed thereof,
    b. throttle position detecting means connected to the throttle for detecting the degree of openness thereof,
    c. and time delay means connected to the ignition means for controlling energisation thereof at a selected time in relation to rotation of said crankshaft,
    d. said time delay means being connected to said speed detecting means and to siad throttle position detecting means for advancing said selected time in response to an increase in the crankshaft speed and for retarding said selected time in response to an increase in the openness of the throttle,
    e. said throttle position detecting means comprising a variable capacitor and means for increasing the capacitance thereof with increasing openness of the throttle, and
    f. said time delay means including
        i. means for charging said capacitor from a predetermined voltage,
        ii. means for subsequently discharging said capacitor in such a manner that the time of such discharge is substantially proportional to the capacitance of the capacitor,
        iii. and means for retarding said selected time in response to an increase in such discharge time.

2. A system according to claim 1, wherein said speed detecting means comprises rotatable pulse generating means connected to rotate with the crankshaft and non-rotating pulse generating means arranged adjacent the path of travel of said rotatable pulse generating means for generating electrical pulses spaced apart by a predetermined number of crankshaft degrees whereby the time period between said pulses varies inversely with crankshaft speed.

3. A system according to claim 2, including
    g. means for generating a fixed time interval,
    h. means for subtracting said fixed time interval from said time period to generate a control period the length of which measured in crankshaft degrees varies inversely with crankshaft speed, and
    i. means for controlling the extent of charging of said capacitor to be proportional to said control period length whereby the time of discharge of said capacitor is also proportional to said control period length.

* * * * *